(12) United States Patent
Tang

(10) Patent No.: US 11,099,555 B2
(45) Date of Patent: Aug. 24, 2021

(54) SURFACE TREATMENT ROBOTIC SYSTEM

(71) Applicant: ECOVACS ROBOTICS CO., LTD., Suzhou (CN)

(72) Inventor: Jinju Tang, Suzhou (CN)

(73) Assignee: ECOVACS ROBOTICS CO., LTD., Suzhou (CN)

( * ) Notice: Subject to any disclaimer, the term of this patent is extended or adjusted under 35 U.S.C. 154(b) by 0 days.

(21) Appl. No.: 16/532,236

(22) Filed: Aug. 5, 2019

(65) Prior Publication Data

US 2019/0361433 A1 Nov. 28, 2019

Related U.S. Application Data

(62) Division of application No. 15/303,849, filed as application No. PCT/CN2015/076516 on Apr. 14, 2015, now Pat. No. 10,429,835.

(30) Foreign Application Priority Data

Apr. 14, 2014 (CN) .......................... 201410149361.2

(51) Int. Cl.
*G05D 1/00* (2006.01)
*G08C 17/02* (2006.01)
*G05D 1/02* (2020.01)

(52) U.S. Cl.
CPC ......... *G05D 1/0022* (2013.01); *G05D 1/0016* (2013.01); *G05D 1/0033* (2013.01);
(Continued)

(58) Field of Classification Search
CPC ................................... G05D 1/0022
(Continued)

(56) References Cited

U.S. PATENT DOCUMENTS 5,043,646 A 8/1991 Smith, III et al.
5,461,292 A * 10/1995 Zondlo .................. G01S 13/74
180/169

(Continued)

FOREIGN PATENT DOCUMENTS

CN 101604153 A 12/2009
CN 102591342 A 7/2012
(Continued)

OTHER PUBLICATIONS

Google Machine Translation of Chinese Patent Pub. No. CN103092205 A to Shi Wenzao et al. (hereinafter "Wenzao") that was effectively filed in 2013 which is prior to the instant priority date of Apr. 14, 2014.*

(Continued)

*Primary Examiner* — Jean Paul Cass
(74) *Attorney, Agent, or Firm* — Maschoff Brennan

(57) ABSTRACT

Provided are a robot, a remote controller, a robotic system and controlling methods for a robot, including a direction sensor determines a reference direction, a control unit determines a moving direction of the robot by using the reference direction as a reference and remote control instructions received from a remote controller and controls the driving unit to drive the robot to move in the moving direction. Different direction sensors are provided in different surface treatment robots to determine the directional references of the robot to determine the walking directions of a robot to enable the buttons on the remote control to correspond to the walking directions; regardless of the movement state of the robot, the robot will automatically walk in the corresponding direction when any button on the remote control is pressed and released or is pressed and held, thus being easy to operate and improving working efficiency.

16 Claims, 2 Drawing Sheets

Figure 1:
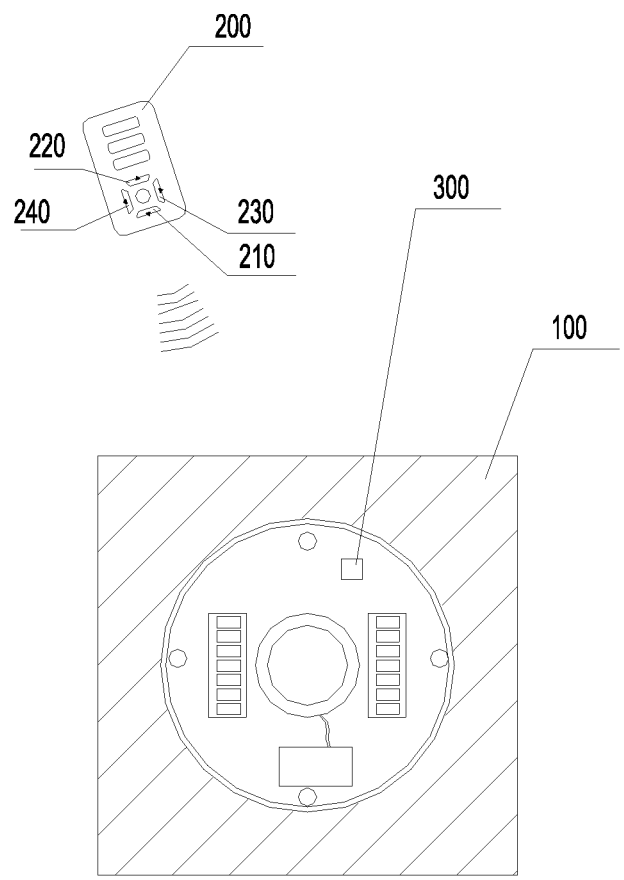

(52) U.S. Cl.
CPC ............. *G05D 1/027* (2013.01); *G08C 17/02* (2013.01); *G05D 2201/0203* (2013.01); *G05D 2201/0216* (2013.01)

(58) Field of Classification Search
USPC .......................................................... 701/2
See application file for complete search history.

(56) References Cited

U.S. PATENT DOCUMENTS

| | | | | |
|---|---|---|---|---|
| 6,232,735 | B1* | 5/2001 | Baba | B25J 9/1689 |
| | | | | 318/567 |
| 6,459,955 | B1* | 10/2002 | Bartsch | G05D 1/0253 |
| | | | | 700/245 |
| 7,554,787 | B2* | 6/2009 | Perline | B62D 57/024 |
| 8,688,375 | B2* | 4/2014 | Funk | G08B 25/016 |
| | | | | 701/495 |
| 9,278,690 | B2* | 3/2016 | Smith | G01S 15/88 |
| 9,427,127 | B2* | 8/2016 | Dooley | A47L 11/4066 |
| 2005/0287038 | A1 | 12/2005 | Dubrovsky et al. | |
| 2006/0112754 | A1* | 6/2006 | Yamamoto | A61B 5/1123 |
| | | | | 73/1.38 |
| 2008/0190953 | A1* | 8/2008 | Mallett | B07C 7/005 |
| | | | | 221/13 |
| 2008/0266254 | A1 | 10/2008 | Robbins et al. | |
| 2009/0166102 | A1* | 7/2009 | Waibel | B63B 59/10 |
| | | | | 180/7.1 |
| 2012/0075672 | A1* | 3/2012 | Oishi | H04N 1/00347 |
| | | | | 358/1.15 |
| 2012/0077515 | A1* | 3/2012 | Oishi | H04W 4/023 |
| | | | | 455/456.1 |
| 2012/0082922 | A1 | 4/2012 | Yamaki | |
| 2013/0082922 | A1* | 4/2013 | Miller | G06F 3/014 |
| | | | | 345/156 |
| 2014/0277744 | A1* | 9/2014 | Coenen | G06N 3/049 |
| | | | | 700/264 |

FOREIGN PATENT DOCUMENTS

| | | |
|---|---|---|
| CN | 202771261 U | 3/2013 |
| CN | 103092205 A | 5/2013 |
| CN | 103177545 A | 6/2013 |
| CN | 203070099 U | 7/2013 |
| CN | 103592944 A | 2/2014 |
| CN | 203812090 U | 9/2014 |

OTHER PUBLICATIONS

Extended European Search Report (EESR) mailed by EPO dated Nov. 22, 2017, for corresponding European Patent Application No. EP 15 77 9201.

Second Office Action mailed by SIPO dated Nov. 29, 2017, for corresponding Chinese Patent Application No. CN 201410149361.2.

International Search Report dated Jul. 15, 2015, for corresponding International Patent Application No. PCT/CN2015/076516. (With English Translation).

Written Opinion dated Jul. 15, 2015, for corresponding International Patent Application No. PCT/CN2015/076516. (With English Translation).

International Preliminary Report on Patentability dated Oct. 18, 2016, for corresponding International Patent Application No. PCT/CN2015/076516.

* cited by examiner

SURFACE TREATMENT ROBOTIC SYSTEM

FIELD OF THE INVENTION

The present invention relates to a surface treatment robotic system.

BACKGROUND ART

Generally, the existed surface treatment robotic system comprises a surface robot and a remote controller. Typically, a remote controller of a window cleaning robot, for example, is provided with front, back, left and right buttons. Such window cleaning robot, which is controlled by the remote controller, normally does not have the function of direction recognition. In the conventional control mode, if the window cleaning robot is intended to adjust its walking direction to walk to the left in its walking-up state, it needs to, firstly, press a button for steering to left until the front end of the window cleaning robot has turned to the horizontal direction, and then press the front button. That is, the existed control method achieves the walking of the robot completely based on visual observation and manual control by means of the remote controller without determining the walking direction of the robot. Therefore, the existed surface treatment robotic system has a high degree of manual intervention and a complicated manipulation, and the remote control efficiency is low.

SUMMARY OF THE INVENTION

In view of the deficiencies in the prior art, the present invention aims to provide a surface treatment robotic system, which is configured to determine direction references by providing different direction sensors in different surface treatment robots and then determine at least four walking directions of the surface treatment robot based on the direction references, and to enable the buttons on the remote controller to correspond one-to-one to the walking directions of the surface treatment robot. When a short or long pressing is applied to any button on the remote controller, the robot may automatically adjust to walk in a corresponding direction regardless of the motion state of the surface treatment robot. The manipulation thereof is convenient and the working efficiency thereof is high.

The technical problem to be solved in the present invention is solved by the following technical solutions:

A surface treatment robotic system comprises a surface treatment robot and a remote controller, wherein the surface treatment robot comprises a control unit and a driving unit; the control unit receives remote control instructions from the remote controller and controls the driving unit to perform corresponding actions; the surface treatment robot is provided with a direction sensor for determining a reference direction; the direction sensor is coupled to the control unit, and the direction sensor transmits the determined reference direction to the control unit; and the control unit determines a walking direction of the robot by referring to the reference direction and according to the remote control instructions input by an input terminal of the remote controller.

The input terminal for inputting the instructions of the remote controller comprises at least four direction buttons configured to input the respective remote control instructions, the remote control instructions being corresponding one-to-one to four walking directions, including the front, the back, the left, and the right walking directions set based on the reference direction, of the surface treatment robot.

In different surface treatment robotic systems, the determination of the reference direction may be achieved by providing different direction sensors.

For example, the surface treatment robot is a tilted surface treatment robot and the direction sensor is a gravity sensor through which a vertical direction is determined as the reference direction.

The remote control instructions comprise an instruction for walking in up, down, left, or right direction with the vertical direction as a reference.

The surface treatment robot is a horizontal surface treatment robot, and the direction sensor is an electronic compass or magnetic compass through which the south direction is determined as the reference direction.

The remote control instructions comprise an instruction for walking in the east, west, south or north direction with the south direction as a reference.

In conclusion, the present invention determines a directional reference by providing different direction sensors in different surface treatment robots, and then determines at least four walking directions of the surface treatment robot based on the direction reference, and enables the buttons on a remote controller to correspond to the walking directions of the surface treatment robot in a one-to-one manner. When shortly or long pressing any button on the remote controller, the robot can automatically adjust to walk in a corresponding direction regardless of the motion state of the surface treatment robot. Thus, the manipulation is convenient and the working efficiency is high.

Hereinafter, the technical solution of the present invention will be described in detail with reference to the accompanying drawings and specific embodiments.

DESCRIPTION OF ATTACHED DRAWINGS

Figure 2:
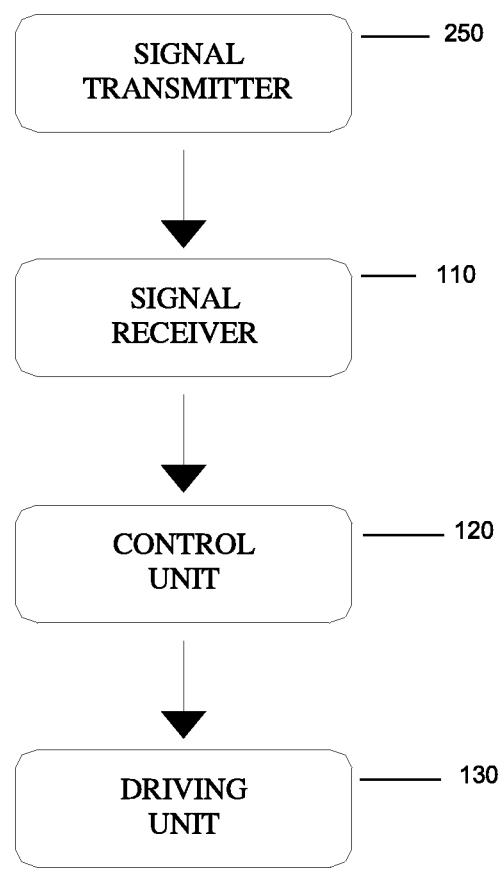

FIG. 1 is a schematic view of signal transmission between a window cleaning robot and a remote controller; and FIG. 2 is a schematic flow diagram of the working principle of a remote controller.

DETAILED DESCRIPTION OF PREFERRED EMBODIMENTS

The present embodiment provides a surface treatment robotic system that is a tilted surface treatment robotic system, comprising a tilted surface treatment robot and a remote controller. Hereinafter, a window-cleaning robot will be described as an example of the tilted surface treating robot. FIG. 1 is a schematic view of signal transmission between the window cleaning robot and the remote controller; and FIG. 2 is a schematic flow diagram of the working principle of the remote controller. As shown in FIG. 1 in combination with FIG. 2, the present embodiment provides a window cleaning robotic system 10 comprising a window cleaning robot 100 and a remote controller 200. The window cleaning robot 100 includes a control unit 120 for receiving remote control instructions from the remote controller 200 and performing corresponding actions and a driving unit 130. Further, the window cleaning robot 100 is provided thereon with a gravity sensor 300 for determining a reference direction. The gravity sensor 300 is coupled to the control unit 120 and transmits a vertical direction determined by the gravity sensor 300 to the control unit 120 as the reference direction. The remote controller 200 is provided therein with a signal transmitter 250, while the window cleaning robot 100 is provided therein with a signal receiver 110 correspondingly. The window cleaning robot 100 receives signals transmitted from the remote controller 200 and transfers the signals to the control unit 120, and the control unit 120 controls the driving unit to perform corresponding actions by using the vertical direction as a reference and according to the instructions output by the remote controller 200.

In the following, the working process of the present invention will be described in detail with reference to specific embodiments.

Now, the window cleaning robot 100 is in turn-on state. Firstly, the gravity sensor 300 provided on the window cleaning robot 100 determines a vertical direction; and determines four directions of up, down, left, and right, which are controlled by four buttons including front button 210, back button 220, left button 230, and right button 240 on the remote controller respectively, for operation of the window cleaning robot 100 by using the vertical direction as a reference. The window cleaning robot 100 receives remote control instructions from the remote controller 200 and conducts corresponding actions. For example, regardless of the direction to which the front end of the window cleaning robot 100 is facing, the window cleaning robot 100 may walk upwards by long pressing the front button 210. During such process, the window cleaning robot 100 can stop immediately upon the button is released at any time. Generally, in addition to the direction buttons, the remote controller is also provided with a stop button. Under the remote control mode of the present embodiment, the stop button on the remote controller 200 can be used to start the robot.

Now, the window cleaning robot 100 is in walking state, and the state of walking upwards is taken as an example. At this time, by shortly pressing any one of the four buttons including front button 210, back button 220, left button 230, right button 240 of the remote controller 200, the window cleaning robot 100 can be controlled to walk towards the corresponding direction with reference to the vertical direction. When the window cleaning robot 100 is desired to turn to walk to the left, the signal transmitter 250 on the remote controller 200 transmits a left walking instruction while the left button 230 is pressed shortly, and the signal receiver 110 on the window cleaning robot 100 receives the corresponding instruction and transfers the same to the control unit 120. The control unit 120 firstly adjusts the position and orientation of the window cleaning robot 100 with reference to the vertical direction determined by the gravity sensor 300 so that the front end thereof can direct to the left, then controls the driving unit 130 to drive the window cleaning robot 100 to walk towards the left. Similarly, when the right button 240 or the back button 220 is pressed shortly, the control unit 120 firstly adjusts the position and orientation of the window cleaning robot 100 until the front end thereof directs to the right or downwards, and then the driving unit 130 drives the window cleaning robot 100 to walk towards the corresponding direction. Obviously, the control unit 120 also can control the window cleaning robot 100 to conduct the action of walking downwards by moving back directly. In the remote control mode of the present embodiment, the walking of the robot can be stopped by using the stop button on the remote controller 200.

As can be known from the above two embodiments, if the user intends the window cleaning robot to move upwards, firstly, a vertical direction is determined by the gravity accelerometer, and the four directions of up, down, left, or right for operation of the window cleaning robot are determined with reference to the vertical direction, and the four directions for operation are controlled by the corresponding four buttons including front button, back button, left button, and right button on the remote controller, respectively. Further, the present invention provides multiple remote control modes, such as a control mode in which the user presses and holds the front button and a control mode in which the user presses the front button shortly. If the robot is not moving upwards at the time when the user long presses the front button, the robot will rotate to the up side in place and then move upwards straightly. If the window cleaning robot faces to the up side at the time when the user long presses the front button, the robot will move upwards directly. During the walking process, the window cleaning robot can stop motion immediately while the front button is released at any time. If the user adopts the mode of pressing the front button shortly, the window cleaning robot will make automatic steering and walk automatically. During the walking process, the user just needs to press the stop button on the remote controller shortly if intending to stop the robot. The functions and the remote control modes of the back, left, right buttons are similar to the above.

The present embodiment provides a horizontal surface treatment robotic system, comprising a horizontal surface treatment robot and a remote controller. In the present embodiment, the horizontal surface treatment robot is a sweeping robot. The sweeping robot is provided with a direction sensor thereon, and the direction sensor may be a magnetic compass or an electronic compass. The electronic compass or magnetic compass can determine the direction of due south, which is used as the reference direction. The sweeping robot comprises a control unit and a driving unit, and the control unit receives remote control instructions from the remote controller and controls the driving unit to perform corresponding actions. The direction sensor is coupled to the control unit, and the electronic compass or magnetic compass transmits the determined reference direction to the control unit. The control unit determines a corresponding walking direction of the robot in accordance with the reference direction, and the walking directions correspond one-to-one to the remote control instructions input from the input terminal of the remote controller. The remote control instructions comprise walking in the direction of the east, the west, the south or the north with a reference of the south direction. Similarly, the four buttons of front button 210, back button 220, left button 230, and right button 240 of the remote controller may be defined to represent command input ends of north, south, west, and east, respectively.

The specific working process of the sweeping robot is described as follows. First, the sweeping robot is in a certain state such as a stationary state immediately after starting up and a motion state during cleaning. At this time, if the sweeping robot is desired to move west, the user may press shortly or press and hold the left button of the remote controller. If the sweeping robot is already in a westward moving state, the sweeping robot may continue moving; and if the sweeping robot is in other directions, with the south direction determined by the electronic compass or magnetic compass as a reference direction, the user may firstly adjust the position and orientation of the sweeping robot until the front end of the robot direct to the direction of the west, then keep shortly or long pressing the left button of the remote controller so that the sweeping robot can continue walking in the direction of the west.

The present embodiment also comprises multiple remote control modes such as a control mode in which the user controls the walking by pressing and holding a button and stops the walking by releasing the button and a control mode in which the walking is controlled by pressing buttons shortly and the walking is stopped by pressing a stop button shortly.

The up, down, left, or right directions or the east, west, south or north directions listed in the above embodiment are due directions, however, by subdividing the angles, the walking control for the surface treatment robotic system in other directions other than the due directions may also be achieved. For example, in above embodiment, the instructions for southeast direction or northwest direction may be added.

In conclusion, the present invention determines a directional reference by providing different direction sensors in different surface treatment robots, and then determines at least four walking directions of the surface treatment robot based on the directional reference, and enables the buttons on a remote controller to correspond to the walking directions of the surface treatment robot in a one-to-one manner. When shortly or long pressing any button on the remote controller, the robot may automatically adjust to walk in a corresponding direction regardless of the motion state of the surface treatment robot. Thus, the manipulation is convenient and the working efficiency is high.

What is claimed is:

1. A robot, comprising a control unit, a driving unit and a direction sensor; wherein the driving unit and the direction sensor are coupled with the control unit respectively, the direction sensor determines a reference direction, and the control unit determines a moving direction of the robot by using the reference direction as a reference and remote control instructions received from a remote controller and controls the driving unit to drive the robot to move in the moving direction, and wherein the remote control instructions comprise instructions for moving the robot in multiple directions with one direction related to the reference direction; the robot works in a tilted surface, the direction sensor is a gravity sensor for determining a vertical direction as the reference direction, and the gravity sensor comprises a gravity accelerometer to determine the vertical direction.

2. The robot according to claim 1, wherein the robot is a tilted robot.

3. The robot according to claim 1, wherein the robot is a horizontal robot, and the direction sensor is an electronic compass or magnetic compass for determining the south direction as the reference direction.

4. A robotic system, comprising:
a robot according to claim 1; and
a remote controller, including an input terminal for receiving remote control instructions input by a user and a signal transmitter for transmitting the remote control instructions to a robot, wherein the remote control instructions comprise instructions for moving the robot in multiple directions with one direction related to a reference direction.

5. The robot according to claim 1, wherein the robot is a horizontal surface treatment robot.

6. A remote controller, comprising an input terminal for receiving remote control instructions input by a user and a signal transmitter for transmitting the remote control instructions to a robot, wherein the remote control instructions comprise instructions for moving the robot in multiple directions with one direction related to a reference direction; wherein the reference direction is determined by a direction sensor of the robot;
the robot works in a tilted surface, the direction sensor is a gravity sensor for determining a vertical direction as the reference direction, and the gravity sensor comprises a gravity accelerometer to determine the vertical direction.

7. The remote controller according to claim 6, wherein the input terminal comprises at least four direction buttons configured to input the respective remote control instructions, the remote control instructions being corresponding one-to-one to four moving directions, including the front, the back, the left, and the right moving directions set based on the reference direction, of the robot.

8. The robotic system of claim 4, wherein the input terminal comprises at least four direction buttons configured to input the respective remote control instructions, the remote control instructions being corresponding one-to-one to four moving directions, including the front, the back, the left, and the right moving directions set based on the reference direction, of the robot.

9. A robotic system, comprising:
a robot according to claim 2; and
a remote controller, including an input terminal for receiving remote control instructions input by a user and a signal transmitter for transmitting the remote control instructions to a robot, wherein the remote control instructions comprise instructions for moving the robot in multiple directions with one direction related to a reference direction.

10. The robotic system of claim 9, wherein the input terminal comprises at least four direction buttons configured to input the respective remote control instructions, the remote control instructions being corresponding one-to-one to four moving directions, including the front, the back, the left, and the right moving directions set based on the reference direction, of the robot.

11. A robotic system, comprising:
a robot according to claim 3; and
a remote controller, including an input terminal for receiving remote control instructions input by a user and a signal transmitter for transmitting the remote control instructions to a robot, wherein the remote control instructions comprise instructions for moving the robot in multiple directions with one direction related to a reference direction.

12. The robotic system of claim 11, wherein the input terminal comprises at least four direction buttons configured to input the respective remote control instructions, the remote control instructions being corresponding one-to-one to four moving directions, including the front, the back, the left, and the right moving directions set based on the reference direction, of the robot.

13. The remote controller according to claim 6, wherein the robot is a horizontal surface treatment robot.

14. The remote controller according to claim 6, wherein the robot is a tilted robot.

15. A robot, comprising a control unit, a driving unit and a direction sensor; wherein the driving unit and the direction sensor are coupled with the control unit respectively, the direction sensor determines a reference direction, and the control unit determines a moving direction of the robot by using the reference direction as a reference and remote control instructions received from a remote controller and controls the driving unit to drive the robot to move in the moving direction, and wherein the remote control instructions comprise instructions for moving the robot in multiple directions with one direction related to the reference direction;

the robot works in a horizontal surface, the remote control instructions comprise an instruction for moving in the east, west, south or north direction with the south direction as a reference.

16. A remote controller, comprising an input terminal for receiving remote control instructions input by a user and a signal transmitter for transmitting the remote control instructions to a robot, wherein the remote control instructions comprise instructions for moving the robot in multiple directions with one direction related to a reference direction; wherein the reference direction is determined by a direction sensor of the robot;

the robot works in a horizontal surface, the remote control instructions comprise an instruction for moving in the east, west, south or north direction with the south direction as a reference.

* * * * *